Patented Apr. 11, 1939

2,154,372

UNITED STATES PATENT OFFICE 2,154,372

SOLVENT REFINING OF OILS

Ernst A. Bösing, Berlin, Germany, assignor to Edeleanu Gesellschaft m. b. H., a corporation of Germany No Drawing. Application June 2, 1938, Serial No. 211,431. In Germany and Rumania June 5, 1937

11 Claims. (Cl. 196—13)

This invention relates to the treatment of hydrocarbon oils with selective solvents, such as pyridine and its homologues or mixtures thereof or mixtures of pyridine or pyridine homologues with nitrobenzene, aniline and others which do not react with alkali.

It is an object of this invention to provide for an improved process by which mineral oils are separated into components of relatively high viscosity index and components of relatively low viscosity index. It is a further object of this invention to produce oils of high paraffinicity and high resistance to oxidation.

In a prior application, Ser. No. 84,163, filed June 8, 1936, and entitled "Solvent treatment of oils" a process is described for contacting hydrocarbon oils with selective solvents in the presence of an aqueous alkaline metal hydroxide solution, whereby a system of essentially three phases is produced, namely an oil-insoluble aqueous alkaline metal hydroxide solution, an extract solution and a raffinate solution, which three phases are separated and separately removed.

It has been explained in said prior application that the addition of the alkali solution results in a more complete separation of the extract- and raffinate-hydrocarbons, a higher yield of a raffinate with better viscosity-temperature characteristics being simultaneously obtained in a shorter time.

I have now found that similar results can be obtained by using aqueous solutions of such salts of the alkali metals as are partly hydrolyzed when dissolved in water. Such salts are for instance hydrosulphides, carbonates, nitrites and fluorides of alkali metals, e. g., NaHS, $K_2CO_3$, $KNO_2$. My invention, therefore, consists in extracting mineral oils with selective solvents, which do not react with alkali, in the presence of a separate phase comprising an aqueous, partly hydrolized alkali metal salt solution whereby three separate phases are obtained namely, a raffinate phase, an extract phase and an aqueous salt solution phase. The three phases are then separated from each other and the solvent is recovered from the raffinate and extract phases, whereas the aqueous alkali salt solution is recycled and re-used in a new extraction step.

When treating mineral oils with a selective solvent in the presence of such an aqueous salt-solution which will neither react with the solvent nor be entirely miscible with it, the following observation is made: after mixing the oil, e. g. a Mid-Continent distillate, and the selective solvent, e. g. pyridine, with an alkaline solution, e. g. an aqueous solution of carbonate of potassium, aggregations of larger droplets are formed at first, but after a few seconds the emulsion breaks and separation of the three phases occurs within a few seconds.

Experiments have proved that at first the aqueous salt-solution forms an emulsion with the precipitated raffinate-solvent phase, whereas the extract-solvent phase does not emulsify with the aqueous salt solution. The salt-solution raffinate-emulsion drops to the bottom of the settler on account of the higher specific gravity of the emulsion relative to the extract-solvent phase. Immediately after agitation is stopped, the extract-solvent phase floats on top, the emulsion formed of raffinate-solution and aqueous salt-solution commences to settle at once. After a few seconds (induction period) the emulsion breaks and the raffinate rises with great rapidity to the upper surface of the settler. Now three phases are formed, namely the raffinate-solvent phase, the extract-solvent phase and the aqueous salt solution phase. It is a further characteristic of the invention that in my process, due to the action of the separate salt solution phase, the raffinate phase constitutes the continuous phase and the extract phase is the dispersed phase, which is the reversed order of conditions existing in a two phase solvent system comprising only a raffinate solvent phase and an extract solvent phase. The important advantage of the phase reversal is that the extract solvent phase, obtained in my process, does not contain emulsified raffinate particles, which contributes to a considerable increase of raffinate yield obtainable in my process as compared with the conventional solvent extraction processes.

The process according to this invention is carried out essentially as described in application Ser. No. 84,163. It will be further explained by way of the following example.

Dewaxed lubricating oil distillate of Persian origin was extracted with 300% by vol. of pyridine, containing 8% of water, at a temperature of $+20°$ C. Two layers—raffinate solution and extract solution—formed after about 6 minutes. The yield of raffinate was 71.8% by vol. Another sample of the same oil was treated in the same manner with the exception that 3.5% by vol. of an aqueous solution containing 67% by weight of $KNO_2$ were added to the solvent-oil-mixture. The three phases separated out clearly after less than a minute, and the yield of raffinate of the same quality as in the first experiment was 80.3% by vol.

Instead of adding the salt solution to the oil-solvent mixture, I may add the salt solution either to the oil or to the solvent prior to contacting oil and solvent with each other.

It is to be understood that my process is not limited to a single extraction of mineral oil with selective solvent in the presence of an aqueous solution of alkali metal salt. After the first extraction step has been completed and after the three phases have been separated from each other, I may further repeatedly contact the raffinate solution with additional solvent and alkali salt solution. This procedure may be carried out in the well known countercurrent manner in which a given portion of selective solvent is used to wash successively a number of raffinate portions while recycling aqueous salt solution in each stage as to always maintain a separate alkali salt solution phase.

Many modifications and variations of the invention, described herein, may be made without departing from the spirit and scope thereof.

I claim:

1. The method of separating high viscosity index from low viscosity index components of mineral oil which comprises contacting the oil with a selective solvent, which does not react with alkali, in the presence of an aqueous partly hydrolized alkali salt solution in sufficient amount to form three phases, thereby causing the extract phase to be dispersed in a continuous raffinate phase, then separating and separately removing raffinate phase, extract phase and alkali salt solution phase.

2. In the refining of hydrocarbon oil with a selective solvent of the class of pyridine and its homologues by which a fraction of relatively high viscosity index is separated as a liquid raffinate phase and another fraction of relatively low viscosity index is separated as a liquid extract phase, the step, of adding to the oil and solvent undergoing treatment an aqueous partly hydrolized alkali salt solution capable of existing as a separate layer in equilibrium with the oil and solvent and in sufficient amount to form a third phase, causing thereby the extract phase to be dispersed in a continuous raffinate phase.

3. The method of separating high viscosity index from low viscosity index components of mineral oil which comprises contacting the oil with a selective solvent non reactive to alkali modified with a pyridine type compound in the presence of an aqueous partly hydrolized alkali salt solution in sufficient amount to form three phases, thereby causing the extract phase to be dispersed in a continuous raffinate phase, then separating and separately removing raffinate phase, extract phase and alkali salt solution phase.

4. The method of refining hydrocarbon oil which comprises extracting the oil with a selective solvent of the type that normally causes a separation of the high viscosity index components from the low viscosity index components, in the presence of a sufficient quantity of an aqueous partly hydrolized alkali salt solution which is chemically unreactive with the solvent to form a separate layer upon separation of phases.

5. In the method of refining hydrocarbon oil with a selective solvent, which does not react with alkali, the addition of a sufficient quantity of an aqueous partly hydrolized alkali salt solution to form a separate layer upon separation of phases and when in contact with the oil and solvent to cause a reversal of the natural order of the phases in the treating zone so that the raffinate oil phase constitutes the continuous phase and the solvent extract phase is dispersed in said continuous raffinate phase before separation.

6. The method of refining hydrocarbon oil which comprises contacting the oil with an aqueous partly hydrolized solution of an alkali salt, and simultaneously contacting the oil with a selective solvent with which said alkali salt does not react chemically and which is capable, in the proportions and at the temperature used, of separating the oil without reacting chemically therewith into a fraction of relatively high viscosity index and into a fraction of relatively low viscosity index.

7. The method of refining hydrocarbon oil comprising contacting the oil with a pyridine type solvent, adding to the mixture a partly hydrolized alkali salt solution in such amount that an oil insoluble aqueous third phase is formed, agitating the entire mixture thoroughly, causing thereby a temporarily stable emulsion of the raffinate phase with the aqueous salt solution, allowing said mixture to separate so that the aqueous salt solution now emulsified with the raffinate-phase drops to the bottom of the container to remain there for a short induction period upon which the raffinite-oil is released to ascend with great rapidity through the extract phase to form a raffinate layer, whereas the aqueous salt solution now freed from emulsified raffinate-oil remains as an oil insoluble aqueous layer at the bottom of the vessel.

8. In the art of separating relatively high viscosity index fractions from mineral oil by means of selective solvents, the improvement which comprises contacting with the oil and solvent, before separating the respective phases, a quantity of aqueous partly hydrolized alkali salt solution unreactive and not wholly miscible therewith, of sufficient strength and volume to cause the extract layer to be the dispersed phase and the raffinate layer to be the continuous phase during the extraction treatment.

9. A method as described in claim 1, in which the aqueous partly hydrolized alkali salt solution consists of potassium nitrite dissolved in water.

10. A method as described in claim 1, in which the aqueous partly hydrolized alkali salt solution consists of potassium carbonate dissolved in water.

11. A method as described in claim 1, in which the aqueous partly hydrolized alkali salt solution consists of sodium hydrosulfide dissolved in water.

ERNST A. BÖSING.